US010809962B2

(12) United States Patent
Files et al.

(10) Patent No.: US 10,809,962 B2
(45) Date of Patent: Oct. 20, 2020

(54) ORIENTING CONTENT SENT TO DISPLAY DEVICES BASED ON A POSITION OF A USER RELATIVE TO A COMPUTING DEVICE

(71) Applicant: Dell Products L.P., Round Rock, TX (US)

(72) Inventors: Jace W. Files, Round Rock, TX (US); John Trevor Morrison, Round Rock, TX (US); James Damon Trim, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/824,494

(22) Filed: Nov. 28, 2017

(65) Prior Publication Data

US 2019/0163432 A1 May 30, 2019

(51) Int. Cl.
| | |
|---|---|
| *G06F 3/14* | (2006.01) |
| *G06F 3/147* | (2006.01) |
| *G06F 1/16* | (2006.01) |
| *G06K 9/00* | (2006.01) |
| *G06F 3/0484* | (2013.01) |

(52) U.S. Cl.
CPC .......... *G06F 3/1446* (2013.01); *G06F 1/1618* (2013.01); *G06F 3/147* (2013.01); *G06K 9/00288* (2013.01); *G06F 3/04845* (2013.01); *G06F 2200/1614* (2013.01); *G06K 9/00255* (2013.01); *G09G 2340/0492* (2013.01)

(58) Field of Classification Search
None
See application file for complete search history.

(56) References Cited

U.S. PATENT DOCUMENTS

| | | | | |
|---|---|---|---|---|
| 2010/0064536 | A1* | 3/2010 | Caskey | G06F 1/1616 33/303 |
| 2010/0218113 | A1* | 8/2010 | White | G06F 1/1626 715/746 |
| 2011/0216064 | A1* | 9/2011 | Dahl | G06F 1/1616 345/428 |
| 2015/0199089 | A1* | 7/2015 | Lee | G09G 5/14 715/716 |
| 2015/0227298 | A1* | 8/2015 | Kim | G06F 3/04845 715/799 |

(Continued)

*Primary Examiner* — Steven Z Elbinger
(74) *Attorney, Agent, or Firm* — Campbell Stephenson LLP; Shiv S. Naimpally

(57) ABSTRACT

In some examples, a computing device may include a first and a second touch screen display device coupled to each other by one or more hinges. The computing device may receive sensor data from one or more sensors, determine a first orientation of the computing device, and determine a first position of a user relative to the computing device. The computing device may route and/or rotate content sent to at least one of the display devices based on the first orientation and the first position. After the user places the computing device in a second orientation, the computing device may, after receiving additional sensor data, determine a second orientation of the computing device and a second position of the user. The computing device may route and/or rotate content sent to at least one of the display devices based on the second orientation and the second position.

20 Claims, 12 Drawing Sheets

(56) References Cited

U.S. PATENT DOCUMENTS

| | | | |
|---|---|---|---|
| 2016/0048363 A1* | 2/2016 | North | G06F 1/1616 |
| | | | 345/1.1 |
| 2017/0075548 A1* | 3/2017 | Fukazawa | G09G 5/377 |
| 2018/0356904 A1* | 12/2018 | Disano | G06F 3/1423 |
| 2018/0357040 A1* | 12/2018 | Spiewla | G06F 3/167 |

* cited by examiner

BOOK ORIENTATION 302

VERTICAL TABLET ORIENTATION 304

ORIENTING CONTENT SENT TO DISPLAY DEVICES BASED ON A POSITION OF A USER RELATIVE TO A COMPUTING DEVICE

BACKGROUND OF THE INVENTION

Field of the Invention

This invention relates generally to computing devices and, more particularly, to orienting content sent to one or more display devices of a portable computing device based on an position of a user relative to the portable computing device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Current computing devices may orient content displayed on a display device associated with a computing device based on an orientation of the computing device relative to gravity rather than relative to the user. For example, when the display of the computing device is positioned approximately perpendicular to the earth's surface, based on sensors that detect the earth's gravitational pull, the computing device may display content in either a portrait mode or a landscape. However, when the display of the computing device is positioned approximately parallel to the earth's surface (e.g., when the computing device is placed on a table), the computing device may retain an orientation that was determined when the display of the computing device was approximately perpendicular to the earth's surface. Thus, a user may be forced to orient the computing device to a desired orientation when the display of the computing device is approximately perpendicular to the earth's surface before placing the computing device on a table.

In addition, computing devices with two (or more) display devices (e.g., also known as "dual-screen devices") may be even more challenging to work with when it comes to orientation. For example, in some orientations of a dual-display device, such as tent mode or tablet mode, a first display device may face the user while a second display device may face away from the user. The user may desire that the display device that is facing away from the user not display content (e.g., for privacy/security purposes) or be turned off (e.g., to conserve power). However, the user may have to manually set which display device displays content and which display device does not because the computing device may not be capable of determining which of the multiple display devices the user is viewing.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may include a first and a second touch screen display device coupled to each other by one or more hinges. The computing device may receive sensor data from one or more sensors, determine a first orientation of the computing device, and determine a first position of a user relative to the computing device. The computing device may route and/or rotate content sent to at least one of the display devices based on the first orientation and the first position. After the user places the computing device in a second orientation, the computing device may, after receiving additional sensor data, determine a second orientation of the computing device and a second position of the user. The computing device may route and/or rotate content sent to at least one of the display devices based on the second orientation and the second position.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
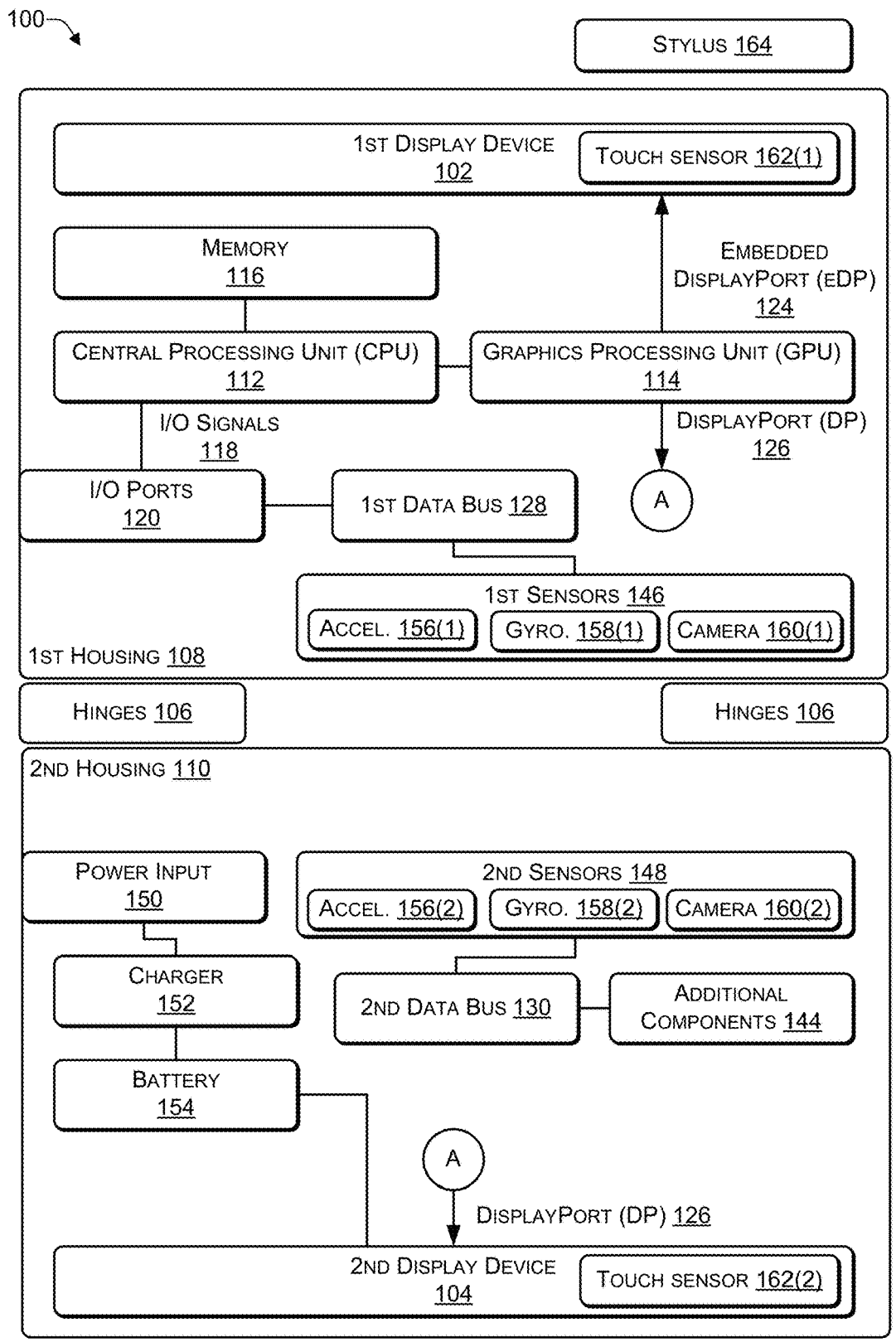
FIG. 1 is a block diagram of an architecture of a computing device according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable a dual-display device to determine an orientation of the dual-display device and to determine a user's position (e.g., orientation) relative to the dual-display device. Based on this information, the dual-display device may determine whether to turn off (or not display content on) one of the display devices and if so, which of the display devices is to be turned off (or not display content) and how content is to be displayed on the display device(s) that remain on. The dual-display display may learn the behavior (e.g., orientation preferences) of the user and use the learned behavior to automatically turn on/off display devices based on the orientation of the dual-display device, e.g., without re-determining the user's position relative to the dual-display device.

The systems and techniques described herein may determine an orientation of a dual-display device, determine when an orientation of the dual-display device has changed, and determine (e.g., track) a position (e.g., orientation) of a user relative to the computing device. The orientation of the dual-display device and changes to the orientation may be determined based on input from sensors, such as, for example, gyroscopes, magnetometers, global positioning satellite (GPS) sensors, accelerometers, hinge movement detection sensors, hinge angle determination sensors, and the like. The position of the user relative to the computing device may be tracked based on receiving touch input (e.g., via a stylus or appendage), face detection (or facial recognition), and the like. When the dual-display device detects a change in orientation, the dual-display device may adjust which display device content is sent to and the orientation of the content that is sent based on the orientation of the dual-display device and based on where the user is currently positioned. Thus, the orientation of the dual-display device may be monitored and when a change in orientation is detected, the position of the user relative to the dual-display device may be determined. The content being output to the display devices may be adjusted according to the orientation of the dual-display device and the position of the user.

The dual-display device may create a user profile to store user preferences and information learned by the dual-display device about how the user interacts with the dual-display device. Each user of the dual-display device may have their own user profile. For example, the dual-display device may determine if the user is left handed or right handed based on receiving stylus input from the user and based on determining a location of the user's face. The dual-display device may store the information about whether the user is left handed or right handed in the user profile of the user. In some cases, the dual-display device may determine which user of multiple users is currently using the dual-display device based on performing facial recognition of the user during or after a login process. For example, if the operating system uses a facial recognition algorithm as part of a login process, the operating system may automatically identify a user profile associated with the user that is logging in and configure the computing device accordingly.

The dual-display device may learn which device orientations the user most often uses and where the user is positioned when using the device in each orientation. For example, when using the dual-display device in tent mode orientation, the user may typically face a first screen (e.g., display device) while having the second screen face away from the user. The dual-display device may store this information in the user profile. When the user is using the dual-display device and positions the dual-display device in tent mode orientation, the dual-display device may automatically rotate (e.g., 0, 90, 180, or 270 degrees) content and route content to the first screen while turning off (or not sending content to) the second screen that is facing away from the user. After automatically routing the content, the dual-display device may verify (e.g., determine) the position of the user relative to the dual-display device. If the dual-display device determines that the user is facing the second screen and not the first screen, the dual-display device may re-route the content to the second screen instead of the first screen.

As a first example, a computing device may include a first display device coupled to a second display device by one or more hinges that enable the first display device to be positioned at an angle between about 0 degrees to about 360 degrees relative to the second display device. The computing device may receive sensor data from at least one of an accelerometer, a gyroscope, a magnetometer, a magnetic compass, a proximity sensor, an imaging sensor, or a touch sensor. The computing device may determine, based at least in part on the sensor data, that a user has moved the computing device from a first orientation to a second orientation. The second orientation may include one of a book orientation, a vertical tablet orientation, a tent orientation, a presentation orientation, a horizontal tablet orientation, or a clamshell orientation. The computing device may determine, based at least in part on the sensor data, a position of a user of the computing device. The position may identify a location of the user relative to the computing device. The computing device may determine a content routing to route content to at least one of the first display device or the second display device, based at least in part on the second orientation of the computing device and the position of the user. The computing device may determine an amount of rotation to apply to the content, based at least in part on the second orientation of the computing device and the position of the user. The computing device may send the content, based on the routing and with the amount of rotation that was determined, to at least one of the first display device or the second display device. The computing device may track the position of the user relative to the computing device during the time that the user is interacting with the computing device based at least in part on the sensor data. The computing device storing, in a profile associated with the user, the second orientation, the position of the user, the routing of the content, and the rotation of the content.

As a second example, a computing device may include a first display device coupled to a second display device by one or more hinges to enable the first display device to be placed at an angle of between about 0 degrees to about 360 degrees relative to the second display device. The computing device may include one or more sensors, such as, for example, an accelerometer, a gyroscope, a magnetometer, a magnetic compass, a proximity sensor, an imaging sensor, or a touch sensor. The computing device may include one or more processors, and a memory (e.g., one or more non-transitory computer readable media) storing instructions executable by the one or more processors to perform various operations. The operations may include receiving sensor data from the one or more sensors, determining, based at least in part on the sensor data, a current orientation of the computing device, and determining, based at least in part on the sensor data, a position of a user relative to the computing device. For example, the position of the user relative to the computing device may be determined by receiving an image captured by an imaging sensor of the computing device, identifying, using face detection, at least a portion of a face of the user in the image, and determining the position of the user relative to the computing device based at least in part on identifying at least the portion of the face of the user in the image. The position of the user relative to the computing device may be determined by receiving touch input data from one of a first touch sensor associated with the first display device or a second touch sensor associated with the second display device. The current orientation of the computing device may be one of a book orientation, a vertical tablet orientation, a tent orientation, a presentation orientation, a horizontal tablet orientation, or a clamshell orientation. The operations may include routing content to at least one of the first display device or the second display device based at least in part on the current orientation of the computing device and the position of the user. The operations may include rotating the content being routed to at least one of the first display device or the second display device based at least in part on the current orientation of the computing device and the position of the user. For example, based on the current orientation, the content sent to at least one of the first display device or the second display device may be rotated by approximately 0 degrees, approximately 90 degrees, approximately 180 degrees, or approximately 270 degrees.

As a third example, a computing device may include a first display device and a second display device, one or more processors, and one or more memory storage devices (e.g., non-transitory computer-readable media) to store instructions that are executable by the one or more processors to perform various operations. The computing device may include one or more sensors, such as, for example, an accelerometer, a gyroscope, a magnetometer, an imaging sensor, and a touch sensor. The operations may include receiving sensor data from one or more sensors of the computing device, determining, based at least in part on the sensor data, a first orientation of the computing device, and determining, based at least in part on the sensor data, a first position of a user relative to the computing device. The first orientation may be one of a book orientation, a vertical tablet orientation, a tent orientation, a presentation orientation, a horizontal tablet orientation, or a clamshell orientation. For example, determining the position of the user relative to the computing device may include receiving an image captured by an imaging sensor (e.g., camera) of the computing device, identifying, using face detection, at least a portion of a face of the user in the image, and determining the position of the user relative to the computing device based at least in part on identifying at least the portion of the face of the user in the image. As another example, determining the position of the user relative to the computing device may include receiving touch input data from one of a first touch sensor associated with the first display device or a second touch sensor associated with the second display device and determining the position of the user relative to the computing device based at least in part on the touch input data. The operations may include routing content to at least one of the first display device or the second display device based at least in part on the first orientation and the first position. The operations may include rotating the content being routed to at least one of the first display device or the second display device based at least in part on the first orientation and the first position of the user. The operations may include receiving additional sensor data from the one or more sensors, determining, based at least in part on the additional sensor data, a second orientation of the computing device, and determining, based at least in part on the additional sensor data, a second position of the user relative to the computing device. The operations may include routing the content to at least one of the first display device or the second display device based at least in part on the second orientation of the computing device and the second position of the user. The operations may include rotating the content being routed to at least one of the first display device or the second display device based at least in part on the second orientation of the computing device and the second position of the user.

FIG. 1 is a block diagram of an architecture of a computing device according to some embodiments. In some implementations, the computing device 100 may include two (or more) housings while in other implementations the computing device 100 may include a single housing (e.g., a tablet form factor). As illustrated in FIG. 1, the computing device 100 may include a first housing 108 coupled to a second housing 110 via one or more hinges 106. The hinges 106 may enable the two housings 108, 110 to be positioned at different angles relative to each other in different orientations (e.g., various vertical orientations and various horizontal orientations). Of course, additional housings may be attached via additional hinges to create a computing device with multiple housings.

A first display device 102 may be located in the first housing 108 and, in some cases, a second display device 104 may be located in the second housing 110. A first portion of the components of the computing device 100 may be located in the first housing 108 (e.g., behind the first display device 102) while a remaining portion of the components of the computing device 100 may be located in the second housing 110 (e.g., behind the second display device 104). For example, as illustrated in FIG. 1, the components located in the first housing 108 may include at least one central processing unit (CPU) 112, a graphics process unit (GPU) 114, and a memory (e.g., computer-readable media) 116. The GPU 114 may be integrated into the CPU 112 or may be a separate device from the GPU 114. The CPU 112 may communicate input/output (I/O) signals 118 via multiple I/O post 120. The I/O ports 120 may include video ports (e.g., a video graphics adapter (VGA) port, a digital video interface (DVI) port, a high definition media interface (HDMI) port, a ThunderBolt® port, or the like), audio ports (e.g., microphone jack, headphone jack, and the like), data ports (e.g., universal serial bus (USB) ports compliant with USB 2.0, USB 3.0, and the like), communication ports (e.g., Ethernet and the like), another type of port, or any combination thereof. In some cases, the computing device 100 may include at least one digital signal processing (DSP) processor 122 to perform audio (and video) signal processing. The GPU 114 may provide two or more lanes of embedded DisplayPort (eDP) output 124 that are sent to the first display device 108 in the first housing 108 and two or more lanes of DisplayPort (DP) output 126 that are sent (e.g., wirelessly or via a cable) to the second display device 110 in the second housing 110.

A first data bus 128 in the first housing 108 and a second data bus 130 in the second housing 110 may distribute data among the various components of the computing device 100. For example, the data buses 128, 130 may distribute data from the I/O signals 118, the I/O ports 120, a first set of sensors 146, a second set of sensors 148, and additional components 144. For example, the data buses 128, 130 may distribute data by receiving data from a component of the computing device 100 and transmitting the data to one or more of the other components of the computing device 100.

The second housing 110 may include a remaining portion of the components of the computing device 100. In some cases, the components in the second housing 110 may be located behind the second display device 104. The second housing 110 may include the additional components 144 (e.g., keyboard, touchpad, trackball, speaker, microphone, Wi-Fi antenna, Bluetooth antenna, Zigbee Antenna, cellular antenna, and the like), the second set of sensors 148, a power input 150 (e.g., alternating current (AC) or direct current (DC) input), a charger 152, and a battery 154. The battery charger 152 may be used as a power source to provide power instead of (or in addition to) the battery 154 when the battery 154 is depleted or inoperable. In some cases, data cables may run through the hinges 106 to connect the components of the computing device 100 located in the first housing 108 with the components of the computing device 100 located in the second housing 110. In other cases, a first wireless transceiver in the first housing 108 and a second wireless transceiver in the second housing 110 may provide wireless communications between (1) the components of the computing device 100 located in the first housing 108 and (2) the components of the computing device 100 located in the second housing 110. The first set of sensors 146 may include one or more of an accelerometer 156(1), a gyroscope 158(1), an electronic compass (e-compass), a barometer, a magnetometer, a proximity sensor, a light sensor, a camera 160(1) (or another type of imaging sensor), a fingerprint sensor, a global positioning satellite (GPS) sensor, a sensor to detect movement of (e.g., detect a change in an angle between) the hinges 106, a proximity sensor, another type of sensor, or any combination thereof. The second set of sensors 148 may include one or more of an accelerometer 156(2), a gyroscope 158(2), an electronic compass (e-compass), a barometer, a magnetometer, a proximity sensor, a light sensor, a camera 160(2) (or another type of imaging sensor), a fingerprint sensor, a global positioning satellite (GPS) sensor, a sensor to detect movement of (e.g., detect a change in an angle between) the hinges 106, a proximity sensor another type of sensor, or any combination thereof.

The first display device 102 may include a touch input sensor 162(1) that is capable of receiving input via pressure applied by a stylus 164 or by a human appendage (e.g., finger) to a surface of the first display device 102. The second display device 104 may include a touch input sensor 162(2) that is capable of receiving input via pressure applied by the stylus 164 or by a human appendage (e.g., finger) to a surface of the second display device 104.

In FIG. 1, the first set of components of the computing device 100 shown as being located in the first housing 108 and the remaining set of components shown as located in the second housing 110 are purely for illustration purposes. Depending on the implementation, different components of the computing device 100 may be housed in one or both of the housings 108, 110. For example, when the computing device 100 is designed for graphics processing, the GPU 114 and supporting hardware (e.g., graphics support chips, graphics memory, and the like) may be housed in the second housing 110. As another example, in some cases, the ports 120 may be located in the first housing 108, in the second housing 110, or split between the two housings 108, 110. As a further example, the battery 154 may include multiple power cells, with a portion of the power cells located in the first housing 108 and zero or more of the power cells located in the second housing 110. In some cases, which components of the computing device 100 are located in each of the housings 108, 110 may be determined by the thermal characteristics of the components. For example, the components may be distributed between the housings 108, 110 to enable each of the housings 108, 110 to heat to approximately the same temperature. Doing so may avoid grouping components that generate the most heat into the same housing, thereby causing one housing to be hotter than the other housing. In addition, while the computing device 100 is illustrated as having two display devices 102, 104, in some cases the computing device 100 may have a single display device, e.g., when the computing device 100 is configured as a tablet (e.g., all components in a single housing) or a laptop computing device (e.g., with a display in the first housing and input devices, such as a keyboard and touchpad, in the second housing).

Software instructions implementing an operating system and one or more applications, including at least one application capable of receiving stylus input, may be stored in the memory 116. The software instructions may be executed by the CPU 112, by the DSP processor 122, or any combination thereof.

Thus, a computing device may include a first housing coupled to a second housing by one or more hinges. The computing device 100 may include software that enables a user to use the computing device 100 with a stylus in a manner similar to a pad of paper (or paper-based notebook) and ink-based pen (or graphite-based pencil). Various sensors, such as, for example, gyroscopes, electronic compasses (e.g., magnetometers), accelerometers, and the like, may be used to determine the screen orientation for the computing device 100. The user's position relative to the computing device 100 may be determined using sensor data (e.g., touch screen data, imaging data, and the like) to determine which display device to enable (e.g., route content to) and which screen to temporarily disable (e.g., turn off or not route content to). The computing device 100 may determine how to orient content on the screen(s) to which content is sent.

Each instance where the computing device determines that the orientation has of the computing device has changed, the computing device may determine the user's position relative to the computing device 100. The user's position may include information such as which display device(s) the user is facing and how the user is positioned (e.g., oriented relative) to each of the display device(s). Based on the device orientation and the user's position, the computing device 100 may route content to one or both display devices and orient the content accordingly (e.g., by rotating the content 0, 90, 180, or 270 degrees). For example, particular orientations, such as, for example, a book orientation, a tent orientation, a presentation orientation, a horizontal orientation, a clamshell orientation, or another orientation may cause the computing device 100 to route content to one or both display devices and determine how much the content is to be rotated when sent to each display device. In addition, the computing device 100 may learn the user's behavior, e.g., whether the user is right handed or left handed, where the user is positioned when providing stylus input, where the user is positioned for each particular orientation of the computing device, and the like. The learned behavior for each user of the computing device 100 may be stored in a user profile and recalled (e.g., retrieved) each time a particular user logs in.

The display devices may be configured to behave as independent display devices or a first display device may be configured as an extension of a second display device to enable both display devices to function as a single larger sized display device. The operating system of the computing device 100 may enable the user to "lock" a particular orientation (e.g., rotation) of the content being displayed on each display device to avoid the computing device 100 repeatedly re-orientating (e.g., rotating) the content as the user moves (e.g., re-positions) the computing device 100.

Figure 2:
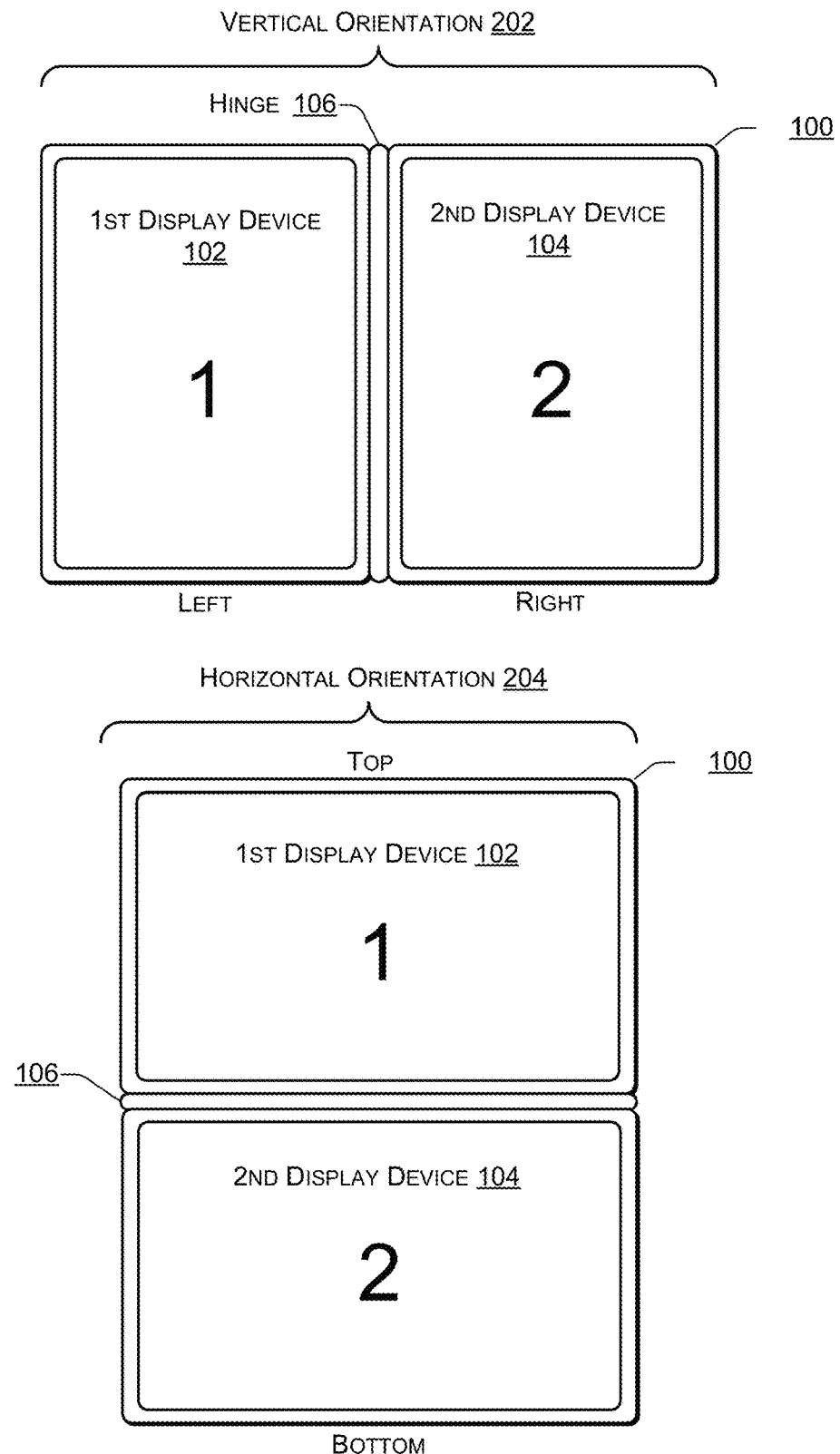
FIG. 2 is a block diagram illustrating different orientations of a dual-display device according to some embodiments.
Figure 3:
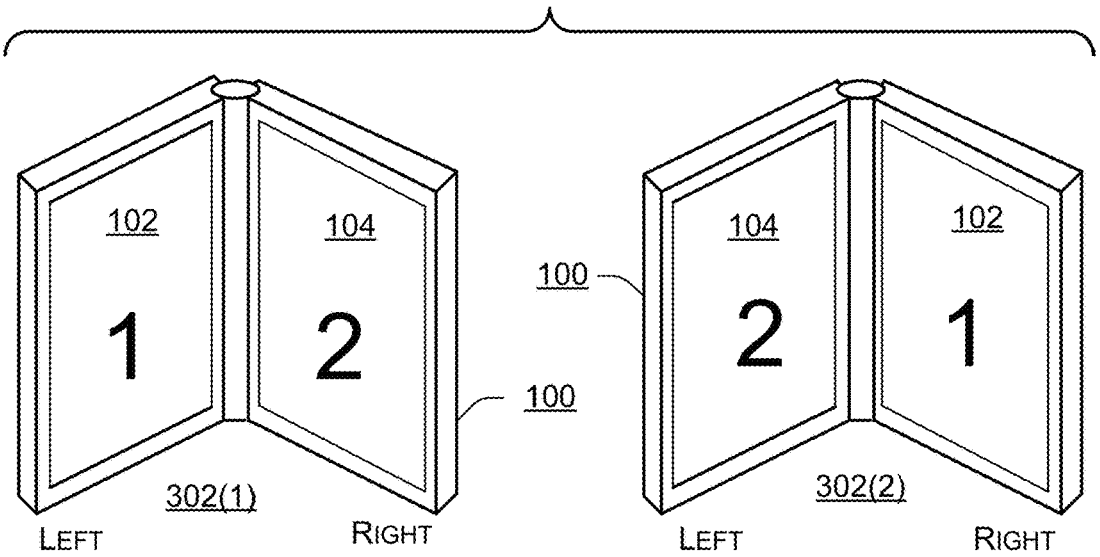
FIG. 3 is a block diagram illustrating modes of a dual-display device in a vertical orientation according to some embodiments.
Figure 3:
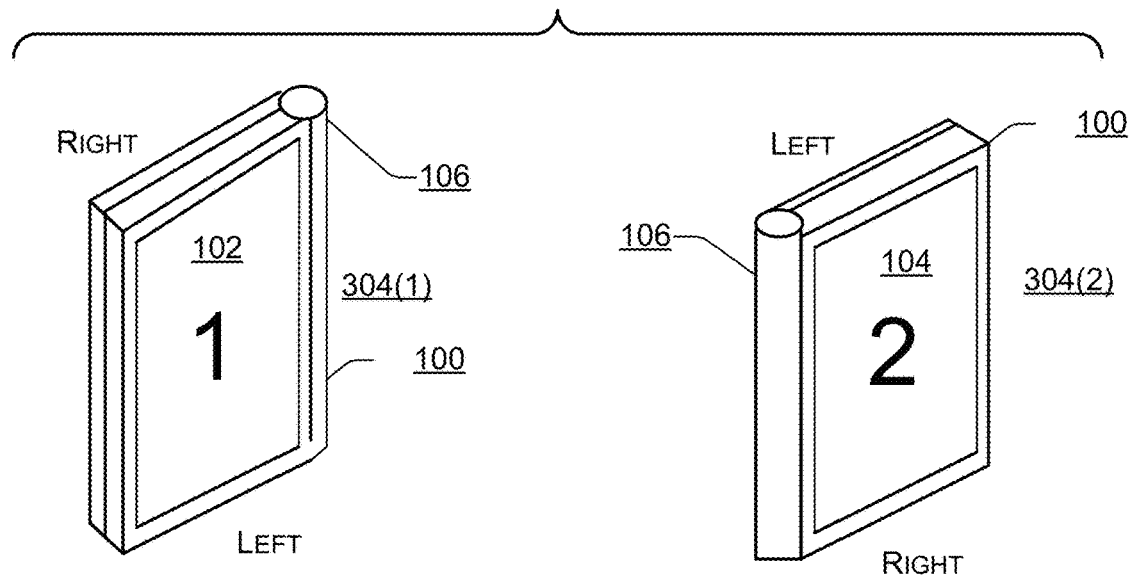

FIG. 2 is a block diagram 200 illustrating different orientations of a dual-display device (e.g., the computing device 100 of FIG. 1) according to some embodiments. The computing device 100 may include at least two display devices 102, 104. The computing device 100 may be displayed in a vertical (e.g., portrait) orientation 202 or a horizontal (e.g., landscape) orientation 204. For example, in the vertical orientation 202, the first display device 102 may be on one side (e.g., the left side or the right side), the second display device 104 may be on another side (e.g., the right side or the left side), and the hinge 106 may join the first display device 102 to the second display device 104. Additional examples of the vertical orientation 202 are illustrated in FIG. 3. In the horizontal orientation 204, the first display device 102 may be located at the top (or the bottom) of the computing device 100 with the hinge 106 in the middle and the second display device 104 may be located at the bottom (or the top) of the computing device 100. Additional examples of the horizontal orientation 204 are illustrated in FIG. 4.

FIG. 3 is a block diagram 300 illustrating additional vertical orientations of a dual-display device according to some embodiments. Additional examples of the vertical orientation 202 may include a book orientation 302 and a vertical tablet orientation 304. For example, in a first book orientation 302(1), the first display device 102 may be on the left and the second display device 104 may be on the right. Alternately, in a second book orientation 302(2), the second display device 104 may be on the left and the first display device 102 may be on the right.

In the vertical tablet orientation 304, the first display device 102 may be on the left and the second display device 104 may be on the right. In a first vertical tablet orientation 304(1), the first display device 102 may be facing a user and the second display device 104 may be rotated approximately 360 degrees to face away from the user. In a second vertical tablet orientation 304(2), the second display device 104 may be facing the user while the first display device 102 may rotated approximately 360 degrees to face away from the user.

Figure 4:
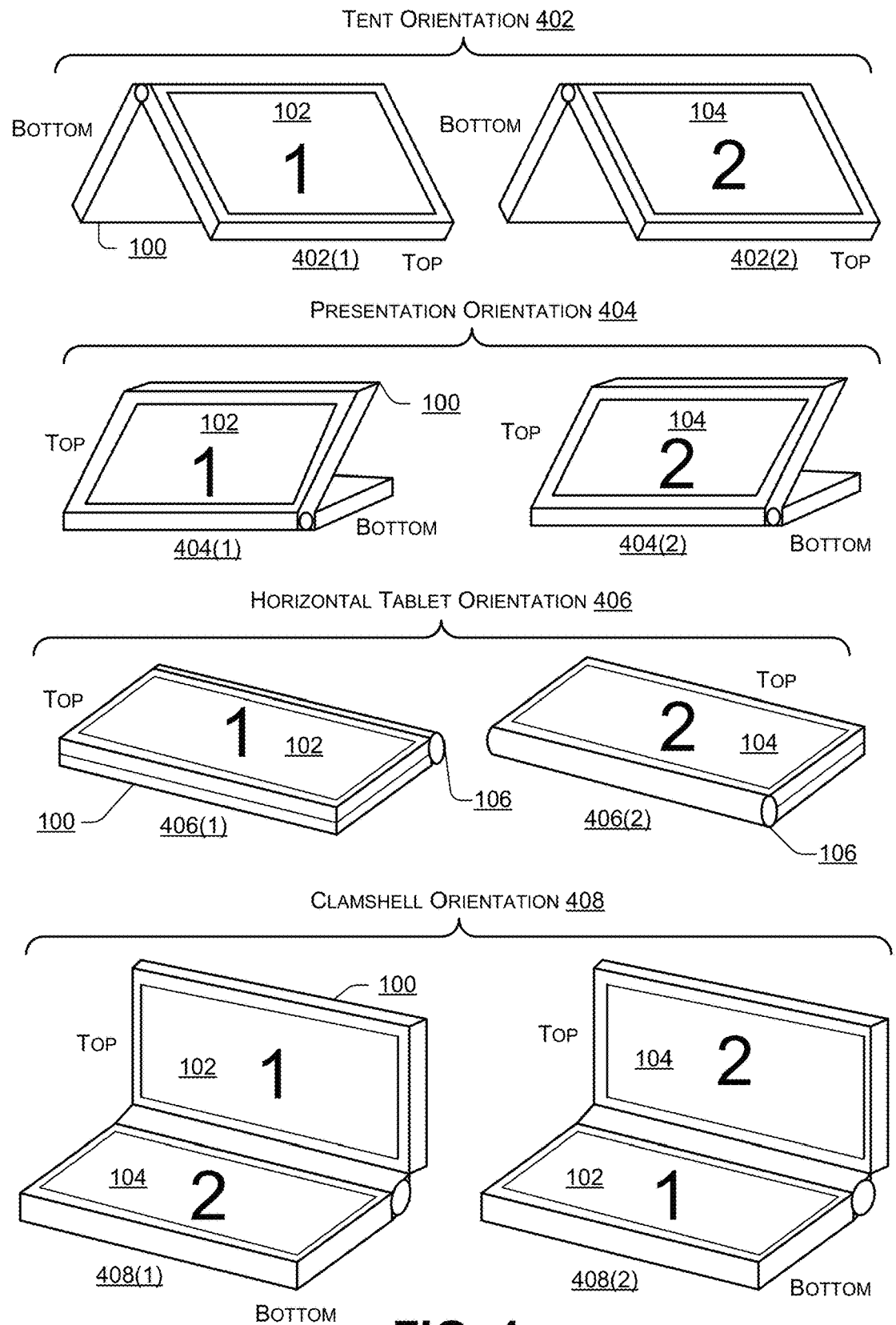
FIG. 4 is a block diagram illustrating modes of a dual-display device in a horizontal orientation according to some embodiments.

FIG. 4 is a block diagram 400 illustrating additional horizontal orientations of a dual-display device according to some embodiments. Additional examples of the horizontal orientation 204 may include a tent orientation 402, a presentation orientation 404, a horizontal tablet orientation 406, and a clamshell orientation 408.

In 402(1), the first display device 102 may be at the top facing the user while the second display device 104 may be at the bottom facing away from the user. In 402(2), the second display device 104 may be at the top facing the user and the first display device 102 may be at the bottom facing away from the user.

In 404(1), the first display device 102 may be at the top facing the user and the second display device 104 may be at the bottom facing down. In 404(2) the second display device 104 may be at the top facing the user and the first display device 102 may be at the bottom facing down.

In 406(1), the first display device 102 may be at the top facing the user and the second display device 104 may be at the bottom facing down (e.g., away from the user). In 406(2), the second display device 104 may be at the top facing the user and the first display device 102 may be at the bottom facing down (e.g., away from the user).

In 408(1), the first display device 102 may be at the top facing the user and the second display device 104 may be at the bottom facing the user (e.g., in a position where traditionally, a keyboard is located in a laptop). In 408(1), in some cases, a QWERTY-based keyboard may be displayed on the second display device 104 and used to receive keyboard input. In 408(2), the second display device 104 may be at the top facing the user and the first display device 102 may be at the bottom facing the user (e.g., in a position where traditionally, a keyboard is located in a laptop). In 408(2), in some cases, a QWERTY-based keyboard may be displayed on the first display device 102 and used to receive keyboard input.

Figure 5:
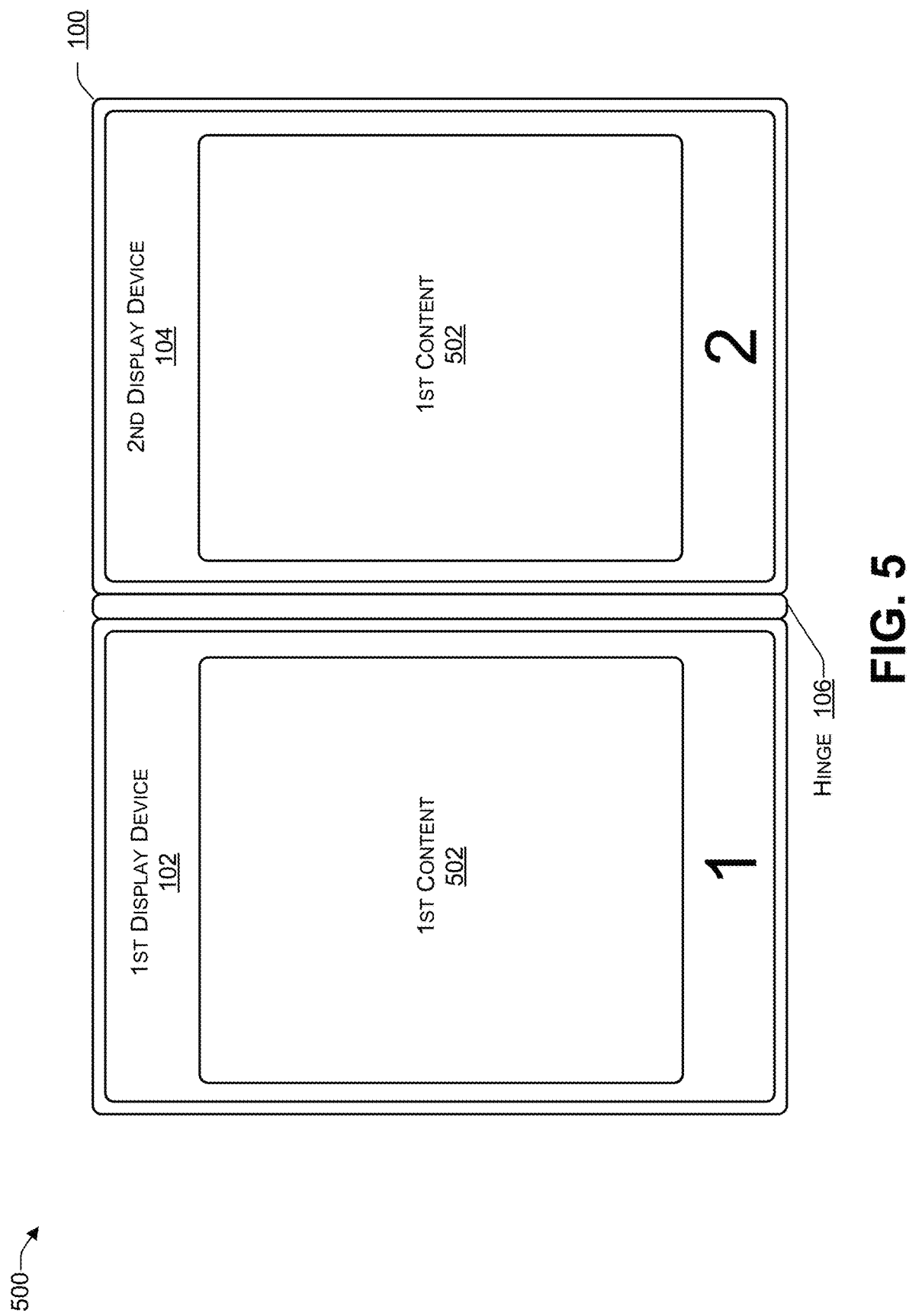
FIG. 5 is a block diagram illustrating a dual-display device in which the operating system is in a clone mode according to some embodiments.

FIG. 5 is a block diagram 500 illustrating a dual-display device in which the operating system is in a clone mode according to some embodiments. An operating system of the computing device 102, such as Microsoft® Windows®, may provide three display modes: (a) an extended desktop mode in which the display devices 110, 112 behave as if they were a single display device, with the display device 112 behaving as an extension of the display device 110 (b) a clone mode in which each of the display devices 110, 112 display the same content, or (c) a single display mode, e.g., one of the display devices 110, 112 displays content while the other display device is off (or blank) and does not display content. For example, single display mode may be used when the computing device is in a tablet orientation to turn off a particular display device (of the display devices 102, 104) that is not facing the user or is not visible to the user.

In the clone mode, first content 502 may be displayed on the first display device 102. The first content 502 may also be displayed on the second display device 104. Thus, in the clone mode, the same content 502 may be displayed on both display devices 102, 104.

Figure 6:
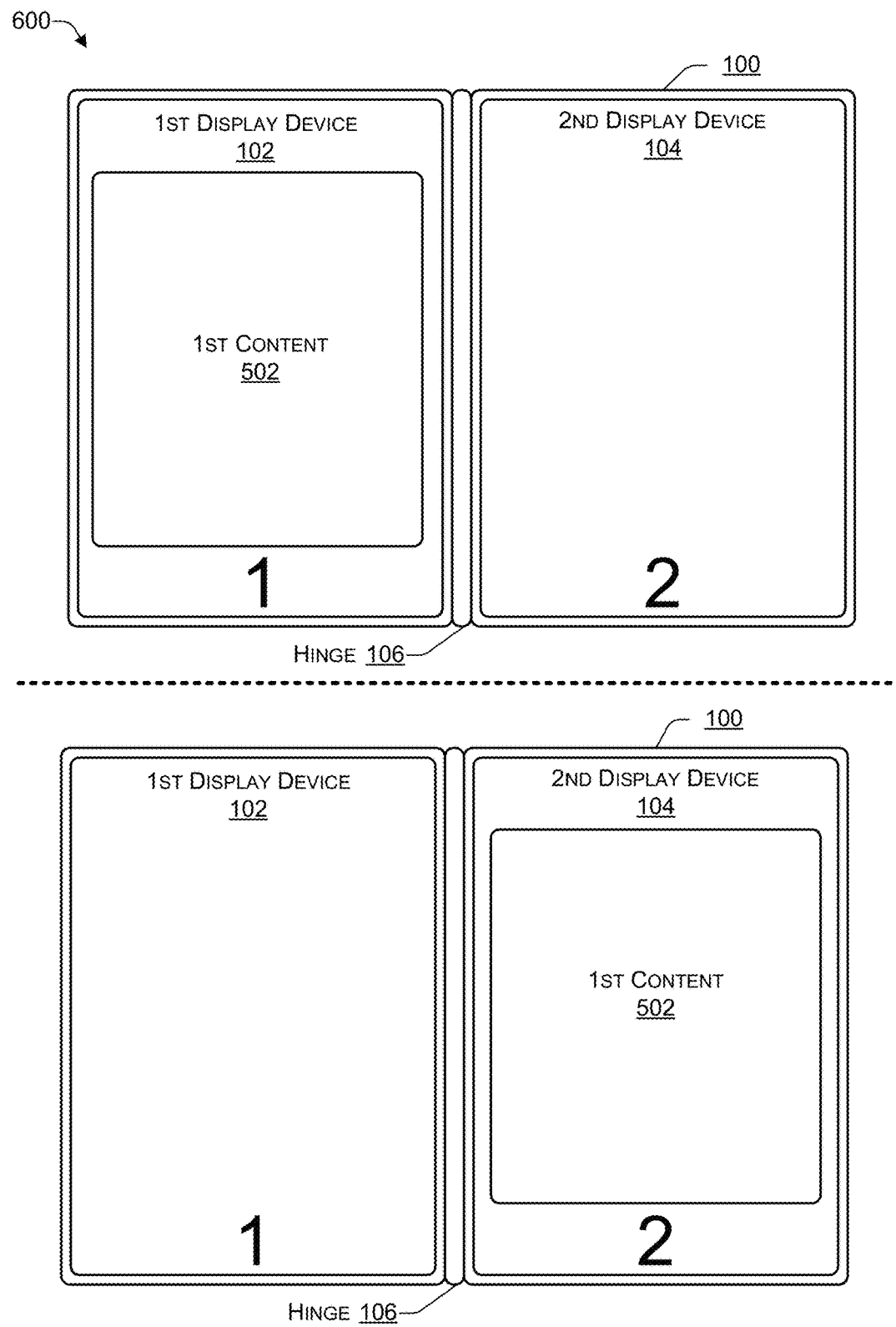
FIG. 6 is a block diagram illustrating a dual-display device in which the operating system is in a single display mode according to some embodiments.

FIG. 6 is a block diagram 600 illustrating a dual-display device in which the operating system is in a single display mode according to some embodiments. When an operating system of the computing device 102 of FIG. 1 is in the single display mode, the first content 502 may be displayed on either (but not both) of the first display device 102 or the second display device 104. For example, the first content 502 may be displayed on the first display device 102 and the second display device 104 may not display any content (e.g., the second display device 104 may be blank or off), as illustrated in the top of FIG. 6. As another example, the first content 502 may be displayed on the second display device 104 and the first display device 102 may not display any content (e.g., the first display device 102 may be blank or off), as illustrated in the bottom of FIG. 6.

Figure 7:
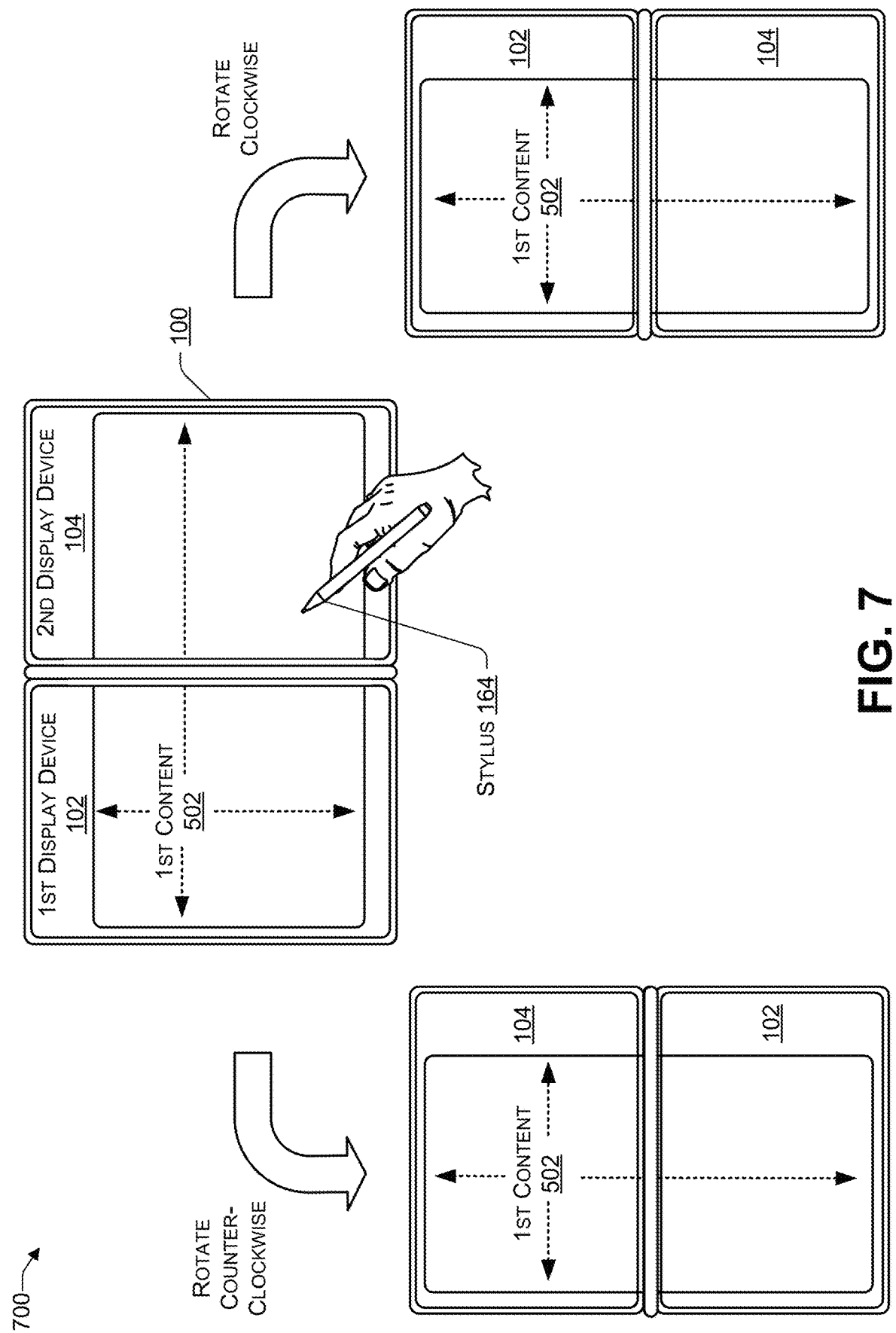
FIG. 7 is a block diagram illustrating a dual-display device in which the operating system is in an extended display mode displaying content that spans both display devices according to some embodiments.

FIG. 7 is a block diagram 700 illustrating a dual-display device in which the operating system is in an extended display mode with content spanning both display devices according to some embodiments. When the operating system of the computing device 102 of FIG. 1 is in the extended display mode, some content, such as the first content 502, may be displayed to span both the first display device 102 and the second display device 104. In some cases, additional content may be displayed on either or both of the first display device 102 or the second display device 104. The user's position relative to the computing device 100 may be determined based on a location of touch-input provided by a user's finger (or other appendage) or a touch-input device, such as the stylus 164.

The dual-display computing device 100 may be placed on a surface that is approximately parallel to the earth's surface. When the user rotates the computing device 100 counter-clockwise, the computing device 100 may automatically re-position the first content 502, as illustrated in FIG. 7, by rotating the content 502 clockwise 90 degrees. When the user rotates the computing device 100 clockwise, the computing device 100 may automatically re-position the first content 502, as illustrated in FIG. 7, by rotating the content 502 clockwise 270 degrees. In this way, when the user re-positions (e.g., re-orients) the computing device 100, the content 502 may be rotated to display the first content 502 in a correct orientation relative to the user. In contrast, when a conventional computing device is placed on a surface, such as a table, and rotated 90 degrees or 270 degrees, the computing device may not re-position the content 502. Instead, with a conventional computing device, the user may be forced to pick up and hold the conventional computing device in such a way that the content 502 is repositioned in the manner the user desires, and then place the conventional computing device back down on the surface.

Figure 8:
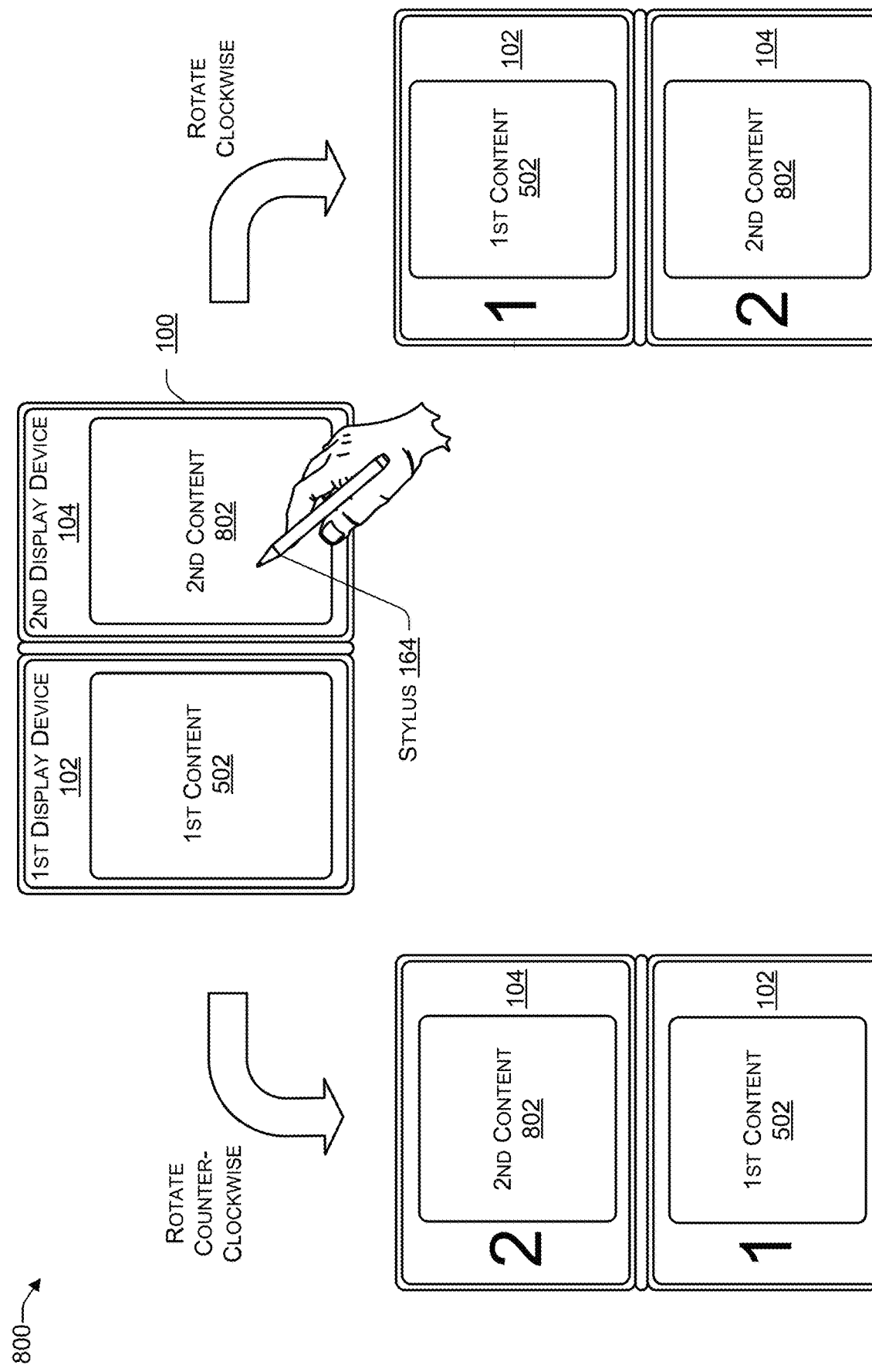
FIG. 8 is a block diagram illustrating a dual-display device in which the operating system is in an extended display mode displaying first content and second content according to some embodiments.

FIG. 8 is a block diagram 800 illustrating a dual-display device in which the operating system is in an extended display mode with first content and second content according to some embodiments. When the operating system of the computing device 102 of FIG. 1 is in the extended display mode, the first content 502 may be displayed on the first display device 102 and second content 802 may displayed on the second display device 104. In some cases, additional content may be displayed on either or both of the first display device 102 or the second display device 104. The user's position relative to the computing device 100 may be determined based on a location of touch-input provided by a user's finger (or other appendage) or a touch-input device, such as the stylus 164.

The dual-display computing device 100 may be placed on a surface that is approximately parallel to the earth's surface. When the user rotates the computing device 100 counter-clockwise, the computing device 100 may automatically re-position the first content 502 and second content 802, as illustrated in FIG. 8, by rotating each of the content 502, 802 clockwise 90 degrees. When the user rotates the computing device 100 clockwise, the computing device 100 may automatically re-position the content 502, 802, as illustrated in FIG. 8, by rotating the content 502, 802 clockwise 270 degrees. In this way, when the user re-positions (e.g., re-orients) the computing device 100, the content 502, 802 may be rotated to a correct (e.g., viewable) orientation relative to the user. In contrast, when a conventional computing device is placed on a surface, such as a table, and rotated clockwise 90 degrees or counterclockwise 90 degrees, the computing device may not re-position the content 502, 802. Instead, with a conventional computing device, the user may be forced to (1) pick up and hold the conventional computing device in such a way that the content 502, 802 is repositioned in the manner the user desires, and then (2) place the conventional computing device back down on the surface.

Figure 9:
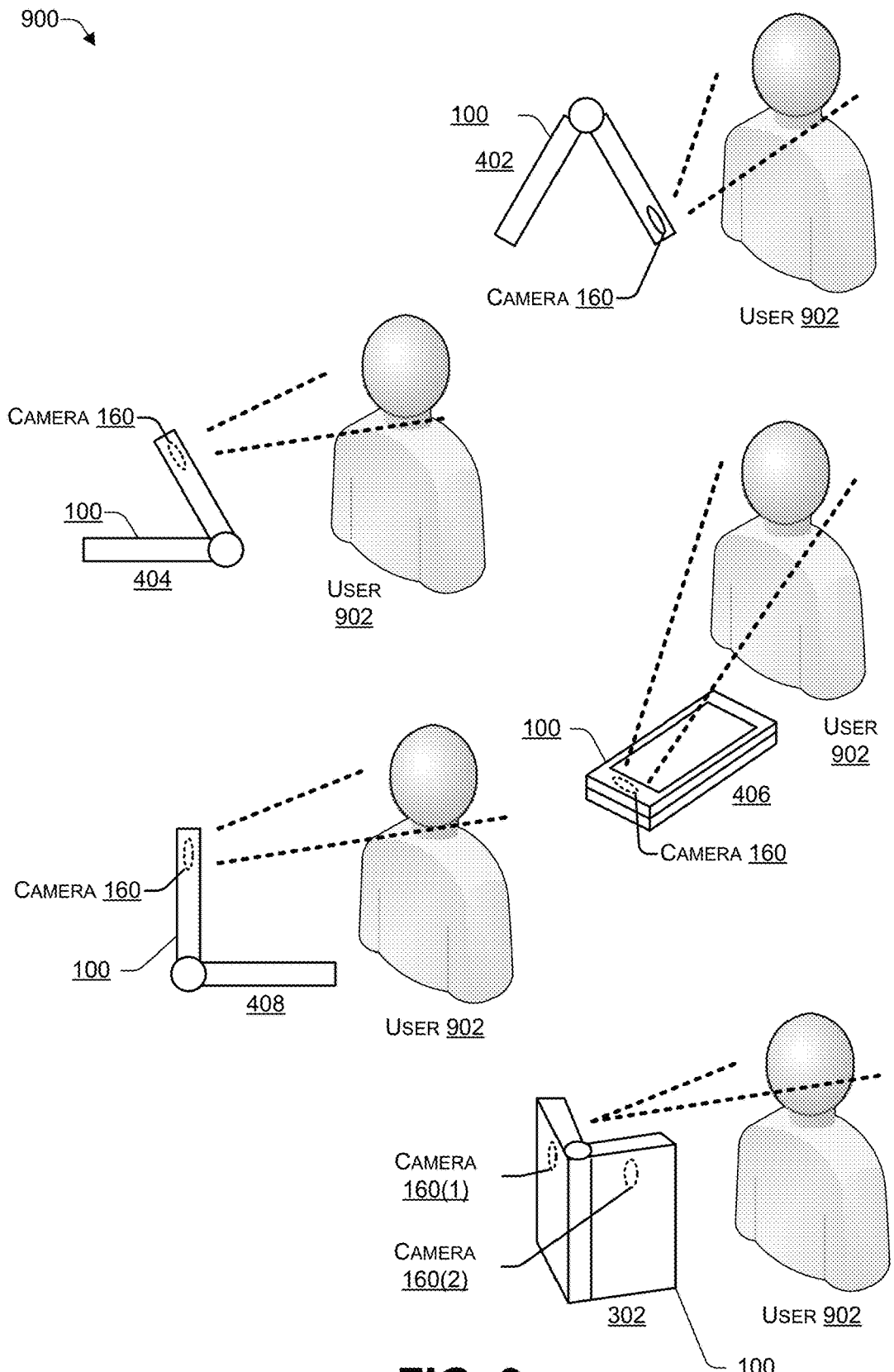
FIG. 9 is a block diagram illustrating a dual-display device using an imaging sensor (e.g., camera) to determine a position of a user according to some embodiments.

FIG. 9 is a block diagram 900 illustrating a dual-display device using an imaging sensor (e.g., camera) to determine a position of a user according to some embodiments. FIG. 9 illustrates how one or more of the cameras (e.g., imaging sensors) 160 of FIG. 1 may be used to determine the position of a user 902 relative to the computing device 100. For example, when the computing device 100 is placed in a particular orientation, one or more of the cameras 160 (or other imaging sensors) of the computing device 100 may be used to capture one or more digital images (e.g., photographs) of the user 902. The computing device 100 may use face detection to determine a position of the user relative to the computing device 100. The position data may indicate which direction the user is facing, which of the display devices 102, 104 the user is facing, an angle of the user relative to at least one of the display devices 102, 104, how far the user is located from at least one of the display devices, and the other position-related information. The computing device 100 may thus use facial detection to determine a position of the user relative to each of the display device s 102, 104 of the computing device 100. Facial recognition may be used to store the user's position and the computing device's orientation in a user profile.

If the computing device 100 determines that the computing device 100 has been placed in a known orientation, the computing device 100 may estimate the position of the user 902 relative to the computing device 100. For example, in known orientations, such as the book orientation 302 (of FIG. 3) or the tent orientation 402, the presentation orientation 404, the horizontal tablet orientation 406, or clamshell orientation 408 (of FIG. 4), if the user is providing touch input (e.g., by typing on a keyboard overlay or by using a stylus/or appendage) via one of the display devices, the computing device 100 may estimate the position of the user 902 relative to the computing device 100.

In the computing device 100 determines that the computing device 100 has been placed in an unknown orientation, the computing device 100 may determine the position of the user 902 relative to the computing device 100. If the user's position relative to the computing device 100 has not been stored in a user profile, then the computing device 100 may determine the user's position (e.g., using touch sensor data, imaging sensor data, and the like), associate the user's position with the device orientation, and store the user's position and device orientation in the user's profile. The computing device 100 may store content routing and rotation information in the user's profile, such as which display device to turn on and which display device to turn off, how many degrees the content sent to the display devices is to be rotated, and the like. Subsequently, when the user places the computing device in a particular orientation, the computing device 100 may recall the user's position associated with the particular orientation based on the user's profile, and configure the routing and rotation of content to one of more of the display devices 102, 104 based on the user's profile.

Thus, in orientations that are known to the computing device, such as the orientations 302, 304, 402, 404, 406, or 408, the computing device may determine a position of the user without using sensor data, or by using touch input data. In other orientations, the position of the user relative to the computing device 100 may be determined the first time the user places the computing device 100 in one of the other orientations. The computing device may determine content routing and rotation based on the device orientation and the user's position and store the information in a user profile. When the user subsequently places the computing device in an orientation, if the computing device 100 determines that the current orientation matches one of the orientations stored in the user profile, the computing device 100 may route and rotate content to the appropriate display devices based on the user profile. In this way, each subsequent time that the computing device 100 is placed in a particular orientation, the computing device 100 may automatically route and rotate content without having to determine the user's position relative to the computing device 100.

Figure 10:
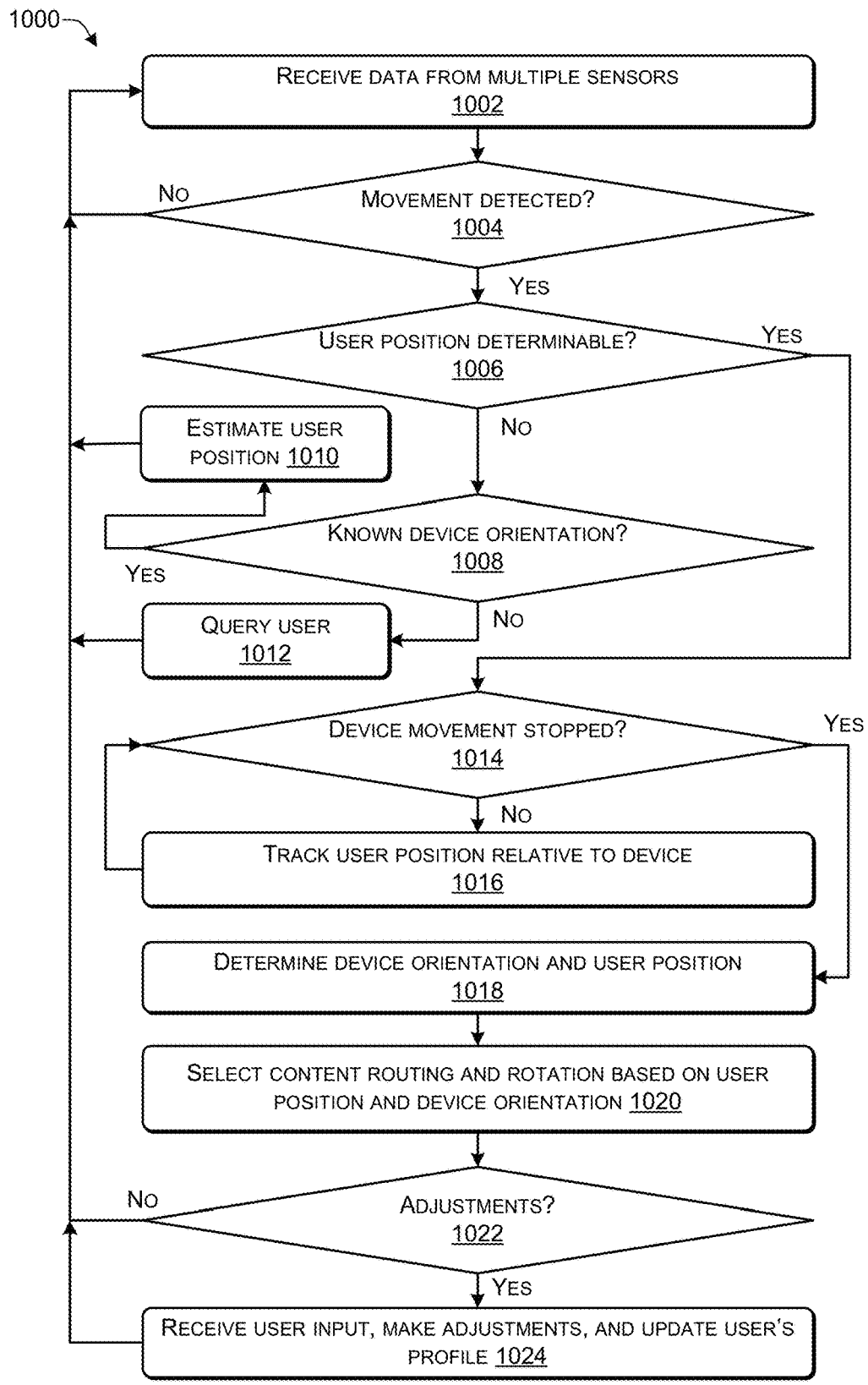
FIG. 10 is a flowchart of a process that includes detecting movement of a dual-display device according to some embodiments.
Figure 11:
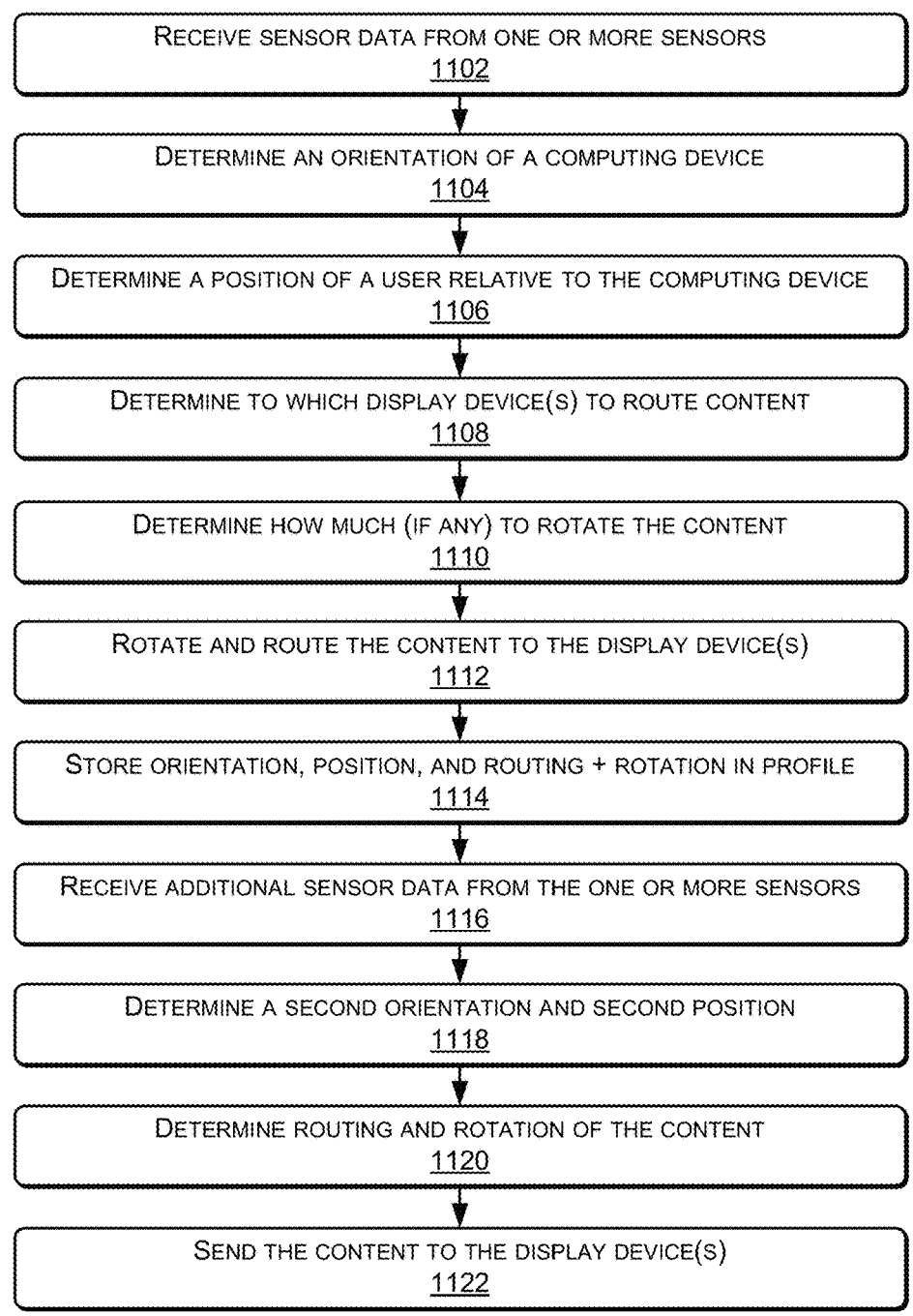
FIG. 11 is a flowchart of a process that includes determining an orientation of a computing device according to some embodiments.

In the flow diagrams of FIG. 10 and FIG. 11, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 1000 and 1100 are described with reference to FIGS. 1, 2, 3, 4, 5, 6, 7, 8, and 9 as described above, although other models, frameworks, systems and environments may be used to implement this process.

FIG. 10 is a flowchart of a process 1000 that includes detecting movement of a dual-display device according to some embodiments. The process 1000 may be performed by software instructions and/or firmware instructions stored in the memory 116 and executed by the CPU 112 of the computing device 100 of FIG. 1.

At 1002, data from multiple sensors may be received. At 1004, a determination may be made (e.g., based on the sensor data) whether movement of the computing device was detected. In response to determining, at 1004, that "no" the computing device was not moved (e.g., not moved a significant amount), the process may proceed to 1002, and to receive additional data from the multiple sensors. In response to determining, at 1004, that "yes" the computing device was moved (e.g., moved a significant amount), the process may proceed to 1006. For example, in FIG. 1, the CPU 112 may receive data from one or more of the sensors 146, 148 and determine, based on the data, whether the computing device 100 has been moved more than a significant (e.g., pre-determined) amount. To illustrate, the user may place the computing device 100 in a particular orientation and then make relatively minor adjustments to the particular orientation to enable the user to view the display devices 102, 104 more easily, to reposition one or more of the cameras 160 (e.g., to participate in a video conference call). If the amount of adjustments that the user makes are less than a predetermined amount, then the adjustments may be considered minor adjustments, and no changes to content being routed to the display devices 102, 104 may be made. If the amount of adjustments that the user makes are greater than or equal to the predetermined amount, then the adjustments may be considered major adjustments, and the process may proceed to 1006.

At 1006, a determination may be made whether the user position can be determined (using the data from the sensors). In response to determining, at 1006, that "no" the user position is indeterminable (using the data from the sensors), the process proceeds to 1008. In response to determining, at 1006, that "yes" the user position can be determined, the process proceeds to 1014. At 1008, a determination may be made whether the computing device is in a known device orientation. In response to determining, at 1008, that "yes" the computing device is in a known device orientation, the user position is estimated, at 1010, and the process proceeds to 1002. In response to determining, at 1008, that "no" the computing device is in an unknown device orientation, the user may be queried as to the desired content routing and content rotation, at 1012, and the process proceeds to 1002. For example, in FIG. 1, if the user's position relative to the computing device 100 can be determined using the data received from the multiple sensors 146, 148, 162 then the process may proceed to 1012, where the computing device 100 may monitor the sensor data until the sensor data indicates that the computing device 100 is not moving (e.g., the device 100 is stationary). If the user's position relative to the computing device 100 cannot be determined using the data received from the multiple sensors 146, 148, 162, then the process may determine if the computing device 100 is in a known orientation (e.g., as illustrated in FIGS. 2, 3, and 4). If the computing device 100 is determined to be in a known orientation, then the user position may be estimated (at 1010), based on the known orientation and based on data from the sensors 146, 148, 162, such as touch input (e.g., created by applying pressure to one of the touchscreen display devices 102, 104), login via facial recognition, and the like. If the computing device 100 is determined to be in an unknown device orientation, then the user may be queried, as to which of the display devices 102, 104 are to display content and how the user desires the content to be rotated (e.g., 0, 90, 180, or 270 degrees).

At 1014, a determination may be made whether the movement of the computing device has stopped. In response to determining, at 1014, that the movement of the computing device has not stopped (e.g., the user is in the process of positioning the computing device), the sensor data may be used to track the position of the user relative to the computing device, at 1016, and the process proceeds to 1014 to determine whether the movement of the device has stopped. In response to determining, at 1014, that the movement of the computing device has stopped (e.g., the user has completed positioning the computing device), the orientation of the computing device and the position of the user relative to the computing device may be determined (e.g., using sensor data), at 1018. For example, in FIG. 1, the computing device 100 may monitor the data from the sensors 146, 148, 162 to track an approximate location of the user relative to the computing device and to determine when the computing device 100 is no longer being moved. After a determination is made that the computing device is no longer being moved, the orientation (e.g., as illustrated in FIGS. 2, 3, and 4) of the computing device and the user's position relative to the computing device 100 may be determined. In some cases, the user's position relative to the computing device 100 may be determined by capturing one or more images of the user using an imaging sensor (e.g., camera) and performing face detection and eye detection to determine which direction (relative to the computing device) the user is facing and which of the display devices 102, 104 the user is viewing.

At 1020, content routing and content rotation may be selected based on the device orientation and the user position. For example, in FIG. 1, if the device orientation and user position is such that the user can view both of the display devices 102, 104 (e.g., one of the orientations 302 or 408), then content may be routed to both of the display devices 102, 104 and rotated accordingly. If the device orientation and user position is such that the user can view one (but not both) of the display devices 102, 104 (e.g., one of the orientations 304, 402, 404, or 406), then content may be routed to whichever of the display devices 102, 104 is viewable by the user and rotated accordingly.

At 1022, a determination may be made whether the user desires to make any adjustments. In response to determining, at 1022, that the user does not desire to make any adjustments, the process may proceed to 1002. In response to determining, at 1022, that the user desires to make adjustments, user input (e.g., regarding where the user is positioned and how the user desires content to be routed and rotated) may be received, adjustments may be made (e.g., the content may be routed and rotated based on the user input), and the user's profile may be updated (e.g., to store the current device orientation, user position, and content routing and rotation preferences). For example, in FIG. 1, the computing device 100 may display information associated with a current orientation of the computing device 100, a current position of the user relative to the computing device 100, to which of the display devices 102, 104 content is being routed, and by how many degrees the content is being rotated. In some cases, the computing device 100 may display at least a portion of this information in a graphical format. The user may be asked to verify the information determined by the computing device 100 and make any adjustments to the information. The user may provide input, including any adjustments to the information. Based on the user input, the computing device 100 may modify the routing and rotation of content to the display devices 102, 104 and update the user's profile to include the adjustments.

FIG. 11 is a flowchart of a process that includes determining an orientation of a computing device according to some embodiments. The process 1100 may be performed by software instructions and/or firmware instructions stored in the memory 116 and executed by the CPU 112 of the computing device 100 of FIG. 1.

At 1102, sensor data may be received from one or more sensors (of a computing device). At 1104, an orientation of a computing device may be determined. At 1106, a position of a user relative to the computing device may be determined. For example, in FIG. 1, the CPU 112 may execute instructions to receive sensor data from the sensors 146, 148, and 162. The instructions may use the sensor data to determine an orientation of the computing device 100, such as, for example, one of the orientations 302, 304 of FIG. 3 or 402, 404, 406, or 408 of FIG. 4. The instructions may use the sensor data to determine a position of the user 902 relative to the computing device 100. For example, the instructions may use one or both of the cameras 160 to capture one or more images and use face detection to determine the position of the user 902 relative to the computing device 100, as illustrated in FIG. 9.

At 1108, a determination may be made whether to route content to the first display device, the second display device, or both. At 1110, a determination may be made whether the content to be routed to the first display device is to be rotated and, if so, by how much (e.g., 90, 180, 270 degrees) and whether the content to be routed to the second display device is to be rotated and if so, by how much (e.g., 90, 180, 270 degrees). At 1112, the content may be routed to one or both of the display devices and, in some cases, the content may be rotated. For example, in FIG. 1, the instructions being executed by the CPU 112 may determine whether the content is to be routed to the first display device 102, the second display device 104, or both. The instructions may determine whether the content to be sent to the display devices 102, 104 is to be rotated and, if so, by how much. For example, in the orientations 302 of FIG. 3 and 408 of FIG. 4, content may be routed to both of the display devices 102, 104. In the orientations, 304 of FIGS. 3 and 404, and 406 of FIG. 4, content may be routed to whichever one of the display devices 102, 104 the user is positioned to view.

In the orientation 404, if the user is working alone, the user may desire that the content be displayed on whichever one of the display devices 102, 104 the user is positioned to view and that the other display device be turned off (e.g., not display content) to conserve energy and/or for privacy purposes. In the orientation 404, if the user is working with someone else, the user may desire that the content be displayed on both of the display devices 102, 104 to enable the user to view the content on one display device and to enable additional users to view the content on the other display device. The user may be asked to specify a content routing for orientation 402 and the user's preference may be stored in the user's profile.

At 1114, the orientation, position, routing, and rotation information may be stored in a user profile. For example, after the instructions being executed by the CPU 112 have gathered information, such as the device orientation, the user position, and content routing and rotation, the instructions may ask the user to provide input to modify the information, and the modified information may be stored in the user's profile. When the user subsequently places the computing device in the same or similar orientation, the instructions may determine that the orientation is a known orientation, retrieve the associated information from the user's profile, and route and rotate the content accordingly.

At 1116, additional sensor data may be received from the one or more sensors. At 1118, a second orientation of the computing device may be determined and a second position of the user relative to the computing device may be determined. For example, in FIG. 1, the CPU 112 may execute instructions to receive additional sensor data from the sensors 146, 148, and 162. The instructions may use the additional sensor data to determine a second orientation of the computing device 100, such as, for example, one of the orientations 302, 304 of FIG. 3 or 402, 404, 406, or 408 of FIG. 4. The instructions may use the additional sensor data to determine a second position of the user 902 relative to the computing device 100. For example, the instructions may use one or both of the cameras 160 to capture one or more images and use face detection to determine the position of the user 902 relative to the computing device 100, as illustrated in FIG. 9.

At 1120, a determination may be made whether to route the content to the first display device, the second display device, or both and whether the content is to be rotated and, if so, by how much (e.g., 90, 180, 270 degrees). At 1122, the content may be sent to one or both of the display devices and, in some cases, the content may be rotated. For example, in FIG. 1, the instructions being executed by the CPU 112 may determine whether the content is to be routed to the first display device 102, the second display device 104, or both. The instructions may determine whether the content to be sent to the display devices 102, 104 is to be rotated and, if so, by how much. The content may be routed and rotated accordingly to one or both of the display devices 102, 104.

Figure 12:
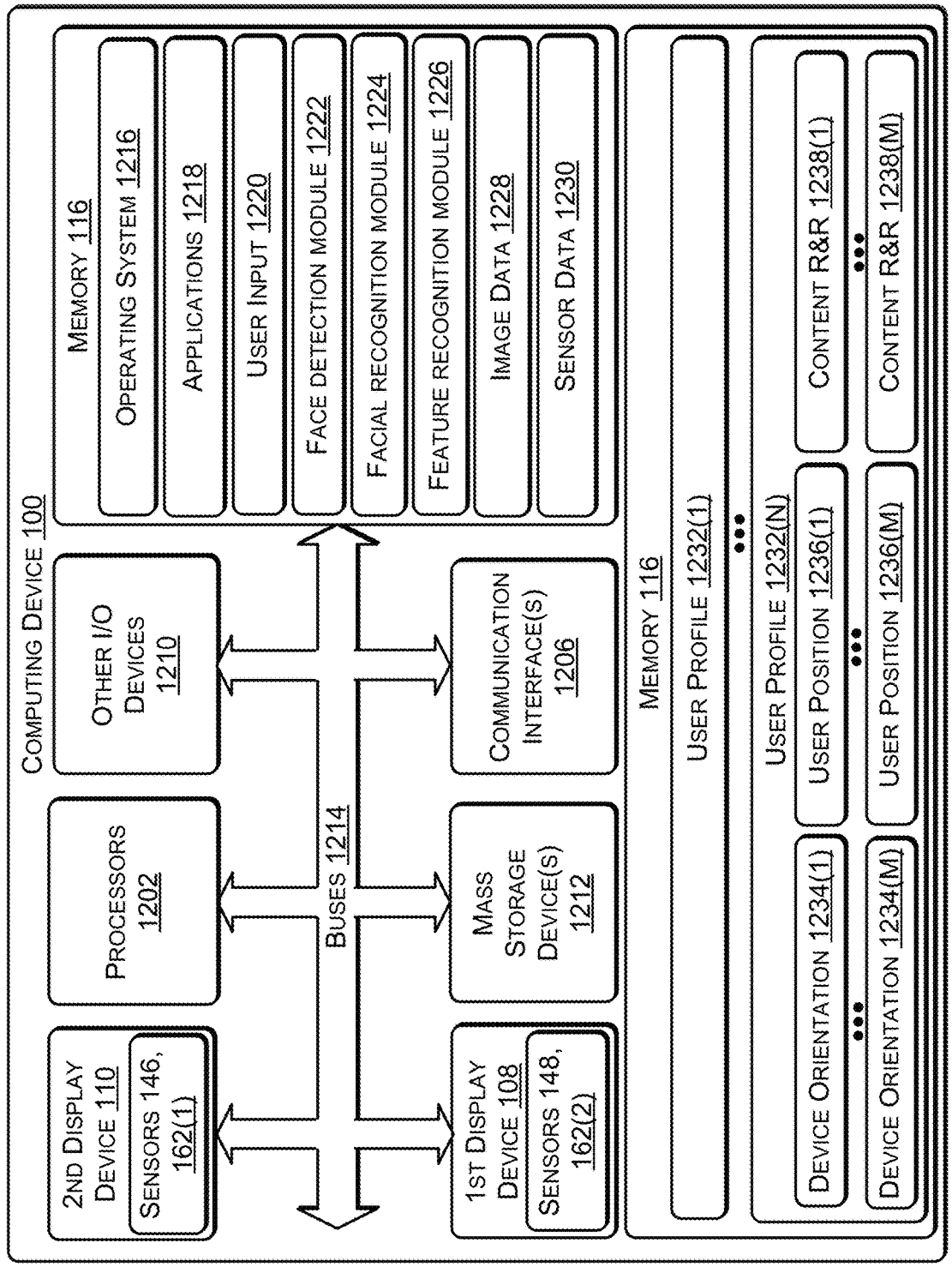
FIG. 12 illustrates an example configuration of a computing device that can be used to implement the systems and techniques described herein.

FIG. 12 illustrates an example configuration of the computing device 100 of FIG. 1 that can be used to implement the systems and techniques described herein. The computing device 100 may include one or more processors 1202 (e.g., the CPU 112 and the GPU 114 of FIG. 1), the memory 116, communication interfaces 1206 (e.g., including the I/O ports 120), the display devices 108, 110, other input/output (I/O) devices 1210 (e.g., keyboard, trackball, and the like, such as the additional components 144), and one or more mass storage devices 1212 (e.g., including the memory 116), configured to communicate with each other, such as via one or more system buses 1214 (e.g., including the data bus 128, 130) or other suitable connections. While a single system bus is illustrated for ease of understanding, it should be understood that the system buses 1214 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 1202 are one or more hardware devices that may include a single processing unit or a number of processing units, all of which may include single or multiple computing units or multiple cores. The processors 1202 may include the GPU 114 integrated into the CPU 112 or the GPU 114 may be a separate processor device from the CPU 112. The processors 1202 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1202 may be configured to fetch and execute computer-readable instructions stored in the memory 116, mass storage devices 1212, or other computer-readable media.

Memory 116 and mass storage devices 1212 are examples of computer storage media (e.g., memory storage devices) for storing instructions that can be executed by the processors 1202 to perform the various functions described herein. For example, memory 116 may include both volatile memory and non-volatile memory (e.g., RAM, ROM, or the like) devices. Further, mass storage devices 1212 may include hard disk drives, solid-state drives, removable media, including external and removable drives, memory cards, flash memory, floppy disks, optical disks (e.g., CD, DVD), a storage array, a network attached storage, a storage area network, or the like. Both memory 116 and mass storage devices 1212 may be collectively referred to as memory or computer storage media herein, and may be any type of non-transitory media capable of storing computer-readable, processor-executable program instructions as computer program code that can be executed by the processors 1202 as a particular machine configured for carrying out the operations and functions described in the implementations herein.

The computing device 100 may also include one or more communication interfaces 1206 for exchanging data via a network. The communication interfaces 1206 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 1206 can also provide communication with external storage, such as a storage array, network attached storage, storage area network, the cloud storage 232, or the like.

The display devices 102, 104 may be located in the housings 108, 110, respectively, and may be connected using one or more hinges (e.g., the hinges 106 of FIG. 1). The hinges may enable each display device to be placed at an angle between about 0 and about 360 relative to the other display device. For example, the display devices 108, 110 may be used for displaying information and images to users. Other I/O devices 1210 may be devices that receive various inputs from a user and provide various outputs to the user, and may include a keyboard, a touchpad, a mouse, a printer, audio input/output devices, and so forth.

The computer storage media, such as memory 116 and mass storage devices 1212, may be used to store software and data. For example, the computer storage media may be used to store an operating system 1216, one or more applications 1218, user input 1220, a face detection module 1222, a facial recognition module 1222, a feature recognition module 1226, image data 1228, sensor data 1230, and user profiles 1232. The user may provide the user input 1220 to adjust (e.g., at 1022 of FIG. 10) or correct the device orientation, the user's position, and the routing and rotation that the computing device 100 determined based on the sensor data 1228, 1230. The face detection module 1222 may use a technique such as a genetic algorithm or an eigen-face technique to detect a face in the image data 1228. The facial recognition module 1224 may use an algorithm to analyze the relative position, size, and/or shape of features, such as the eyes, nose, cheekbones, and jaw identified in the image data 1228 and match the features with previously stored features of previously captured images. The feature recognition module 1226 may recognize the various facial features of a user. The image data 1228 may be captured by an imaging device, such as the cameras 160 of FIG. 1. The sensor data 1230 may include data captured by one or more of the sensors 146, 148, 162 of FIG. 1.

The memory 116 may be used to store user profiles 1232(1) to 1232(N) (where N>0), with N representing the number of unique users using the computing device 100. Each user profile 1232(N) may include one or more device orientations 1234(1) to 1234(M) (M>0). Each of the device orientations 1234(1) to 1234(M) may have a corresponding user position 1236(1) to 1236(M) and content routing and rotation data 1238(1) to 1238(M). For example, if the computing device 100 determines that a current device orientation matches the device orientation 1234(M), then the computing device 100 may determine where the user is positioned relative to the computing device by retrieving the corresponding user position 1236(M) and route and rotate content based on the corresponding content routing and rotation 1238(M).

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   determining, by a computing device comprising a first display device and a second display device, that at least one of the first display device or the second display device is being moved by a user;
   tracking, based at least in part on sensor data, a change of a position of the user relative to the first display device and second display device while:
      at least one of the first display device or the second display device is being moved by the user;
   after determining that both the first display device and second display device have stopped moving, determining, by the computing device, that the computing device has moved from a first orientation to a second orientation;
   determining, by the computing device, a current position of the user that identifies a location of the user relative to the computing device;
   determining, by the computing device, a routing of content sent to at least one of the first display device or the second display device based at least in part on:
      the second orientation of the computing device; and
      the current position of the user based at least part on the tracking;
   determining, by the computing device, a rotation of the content sent to at least one of the first display device or the second display device based at least in part on:
      the second orientation of the computing device; and
      the current position of the user;
   and
   sending the content, based on the routing and the rotation, to at least one of the first display device or the second display device.

2. The method of claim 1, wherein the second orientation comprises one of a book orientation, a vertical tablet orientation, a tent orientation, a presentation orientation, a horizontal tablet orientation, or a clamshell orientation.

3. The method of claim 1, further comprising:
   receiving the sensor data from at least one of an accelerometer, a gyroscope, a magnetometer, a magnetic compass, a proximity sensor, an imaging sensor, or a touch sensor.

4. The method of claim 1, further comprising:
   storing, in a profile associated with the user, the second orientation, the position of the user, the routing of the content, and the rotation of the content.

5. The method of claim 4, further comprising:
   determining, by the computing device, position data associated with the user, the position data comprising one or more of:
      a direction the user is facing;
      a display device that the user is facing;
      an angle of the user relative to at least one of the display devices; and
      a measurement value of a distance that the user is located from the at least one of the display devices;
   selecting, in response to the determining the position data, the profile based on an identification of the user; and
   configuring the computing device based on the profile.

6. The method of claim 1, further comprising:
   determining, by the computing device, that:
      the first display device and the second display device are positioned parallel or approximately parallel to an earth's surface;
      the first orientation of the computing device is one of a vertical orientation and a horizontal orientation; and
      the second orientation of the computing device is another of the vertical orientation and the horizontal orientation,
   wherein a direction of the rotation is parallel or approximately parallel to the earth's surface.

7. The method of claim 1, wherein tracking the change of the position of the user comprises:
   receiving an image captured by an imaging sensor of the computing device;
   identifying, using face detection, at least a portion of a face of the user in the image; and
   determining an additional position of the user relative to the computing device based at least in part on identifying at least the portion of the face of the user in the image.

8. The method of claim 1, wherein tracking the change of the position of the user comprises:
   receiving touch input data from one of a first touch sensor associated with the first display device or a second touch sensor associated with the second display device; and
   determining an additional position of the user relative to the computing device based at least in part on the touch input data.

9. The method of claim 1, further comprising:
rotating, based on the second orientation of the computing device, the content sent to at least one of the first display device or the second display device by approximately 90 degrees, approximately 180 degrees, or approximately 270 degrees.

10. A computing device comprising:
a first display device;
a second display device;
one or more hinges coupling the first display device to the second display device, wherein the one or more hinges enable the first display device to be placed at an angle between 0 degrees and 360 degrees relative to the second display device;
one or more sensors;
one or more processors;
one or more non-transitory computer readable media storing instructions executable by the one or more processors to perform operations comprising:
  receiving sensor data from the one or more sensors;
  determining that at least one of the first display device or the second display device is being moved by a user;
  tracking, based at least in part on the sensor data, a change of a position of the user relative to the first display device and second display device while:
    at least one of the first display device or the second display device is being moved by the user;
  after determining that both the first display device and second display device have stopped moving, determining that the computing device has moved from a first orientation to a second orientation;
  determining a current position of the user that identifies a location of the user relative to the computing device;
  routing content to at least one of the first display device or the second display device based at least in part on:
    the second orientation of the computing device; and
    the current position of the user based at least part on the tracking; and
  rotating the content being routed to at least one of the first display device or the second display device based at least in part on:
    the second orientation of the computing device; and
    the current position of the user.

11. The computing device of claim 10, wherein the second orientation of the computing device comprises one of a book orientation, a vertical tablet orientation, a tent orientation, a presentation orientation, a horizontal tablet orientation, or a clamshell orientation.

12. The computing device of claim 10, wherein the operations further comprise:
receiving the sensor data from at least one of an accelerometer, a gyroscope, a magnetometer, a magnetic compass, a proximity sensor, an imaging sensor, or a touch sensor.

13. The computing device of claim 10, wherein tracking the change of the position of the user comprises:
receiving an image captured by an imaging sensor of the computing device;
identifying, using face detection, at least a portion of a face of the user in the image; and
determining an additional position of the user relative to the computing device based at least in part on identifying at least the portion of the face of the user in the image.

14. The computing device of claim 10, wherein tracking the change of the position of the user comprises:
receiving touch input data from one of a first touch sensor associated with the first display device or a second touch sensor associated with the second display device; and
determining an additional position of the user relative to the computing device based at least in part on the touch input data.

15. The computing device of claim 10, further comprising:
rotating, based on the second orientation of the computing device, the content sent to at least one of the first display device or the second display device by approximately 90 degrees, approximately 180 degrees, or approximately 270 degrees.

16. One or more non-transitory computer-readable media storing instructions that are executable by one or more processors to perform operations comprising:
receiving sensor data from one or more sensors of a computing device, the computing device comprising a first display device and a second display device;
determining, by a computing device comprising a first display device and a second display device, that at least one of the first display device or the second display device is being moved by a user;
tracking, based at least in part on the sensor data, a change of a position of the user relative to the first display device and second display device while:
  at least one of the first display device and second display device is being moved by the user;
after determining that both the first display device and second display device have stopped moving, determining, by the computing device, that the computing device has moved from a first orientation to a second orientation;
determining, by the computing device, a current position of the user that identifies a location of the user relative to the computing device;
routing content to at least one of the first display device or the second display device based at least in part on:
  the second orientation of the computing device; and
  the current position of the user based at least part on the tracking; and
rotating the content being routed to at least one of the first display device or the second display device based at least in part on:
  the second orientation of the computing device; and
  the current position of the user.

17. The one or more non-transitory computer-readable media of claim 16, wherein the first orientation comprises one of a book orientation, a vertical tablet orientation, a tent orientation, a presentation orientation, a horizontal tablet orientation, or a clamshell orientation.

18. The one or more non-transitory computer-readable media of claim 16, wherein the one or more sensors comprise an accelerometer, a gyroscope, a magnetometer, an imaging sensor, and a touch sensor.

19. The one or more non-transitory computer-readable media of claim 16, wherein tracking the change of the position of the user comprises:
receiving an image captured by an imaging sensor of the computing device;
identifying, using face detection, at least a portion of a face of the user in the image; and determining an additional position of the user relative to the computing device based at least in part on identifying at least the portion of the face of the user in the image.

20. The one or more non-transitory computer-readable media of claim 16, wherein tracking the change of the position of the user comprises:

receiving touch input data from one of a first touch sensor associated with the first display device or a second touch sensor associated with the second display device; and determining the current position of the user relative to the computing device based at least in part on the touch input data.

\* \* \* \* \*